United States Patent
Jeon et al.

(10) Patent No.: US 12,541,635 B2
(45) Date of Patent: Feb. 3, 2026

(54) METHOD FOR OPTICAL PROXIMITY CORRECTION OF PHOTOMASK LAYOUT UTILIZING PARAMETERS OBTAINED THROUGH ACTUAL PHOTOMASK MANUFACTURE

(71) Applicant: Samsung Electronics Co., Ltd., Suwon-si (KR)

(72) Inventors: Sorang Jeon, Seoul (KR); Sunghoon Jang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 666 days.

(21) Appl. No.: 17/860,225

(22) Filed: Jul. 8, 2022

(65) Prior Publication Data

US 2023/0205970 A1 Jun. 29, 2023

(30) Foreign Application Priority Data

Dec. 23, 2021 (KR) ........................ 10-2021-0185937

(51) Int. Cl.
  *G06F 30/398* (2020.01)
  *G06F 30/392* (2020.01)
  *G06F 119/02* (2020.01)

(52) U.S. Cl.
  CPC .......... *G06F 30/398* (2020.01); *G06F 30/392* (2020.01); *G06F 2119/02* (2020.01)

(58) Field of Classification Search
  CPC .. G06F 30/398; G06F 30/392; G06F 2119/18; G06F 30/39; G06F 2119/12; G06F 2119/08; G06F 30/367; G06F 30/20; G06F 30/27; G06F 30/3308; G06F 30/337; G06F 30/373; G06F 30/327; G06F 30/33; G06F 30/394; G06F 30/3953; G06F 30/31; G06F 30/30; G06F 30/396; G06F 30/3947;
  (Continued)

(56) References Cited

U.S. PATENT DOCUMENTS 10,031,413 B2 7/2018 Fujimura et al.
10,137,643 B2 11/2018 Cao et al.
(Continued)

FOREIGN PATENT DOCUMENTS

KR 10-2008-0102648 A 11/2008
KR 10-2011-0021998 A 3/2011

OTHER PUBLICATIONS

Office Action issued Jul. 24, 2025 in Korean Application No. 10-2021-0185937.
(Continued)

*Primary Examiner* — Binh C Tat
(74) *Attorney, Agent, or Firm* — Harness, Dickey & Pierce, P.L.C.

(57) ABSTRACT

A mask layout optical proximity correction (OPC) method includes determining a target pattern to be formed on a substrate, simulating a photomask layout based on the target pattern, applying a bias to the simulated photomask layout, thereby correcting the photomask layout into a first modeling layout, and selecting one of control parameters obtained through modeling using a layout of a split mask, thereby deforming the first modeling layout into a second modeling layout, and checking whether or not there is a mask rule check (MRC) violation, based on the second modeling layout.

18 Claims, 9 Drawing Sheets

(58) Field of Classification Search
CPC .... G06F 30/3312; G06F 30/333; G06F 30/38; G06F 30/347; G06F 1/12; G06F 2113/04; H01L 23/528; H01L 21/0332; H01L 21/0337; G03F 7/70441; G03F 1/38; G03F 7/70433; G03F 1/26; G03F 1/76; G03F 7/705; G03F 1/36; G03F 1/70
USPC ..................................................... 716/50–56
See application file for complete search history.

(56) References Cited

U.S. PATENT DOCUMENTS

| | | |
|---|---|---|
| 10,831,977 B1 | 11/2020 | Gheith et al. |
| 10,962,875 B2 | 3/2021 | Huang et al. |
| 2012/0183891 A1* | 7/2012 | Minamide ............. G06F 30/398 430/312 |
| 2013/0346037 A1 | 12/2013 | Pierrat |
| 2019/0094680 A1 | 3/2019 | Huang et al. |
| 2019/0146355 A1* | 5/2019 | Jheng ........................ G03F 1/36 716/53 |
| 2020/0242294 A1* | 7/2020 | Chen ......................... G03F 1/70 |
| 2021/0080838 A1 | 3/2021 | Tel et al. |
| 2021/0116816 A1 | 4/2021 | Peng et al. |
| 2021/0132486 A1 | 5/2021 | Melvin, III et al. |
| 2021/0191254 A1 | 6/2021 | Huang et al. |
| 2021/0247701 A1 | 8/2021 | Li et al. |
| 2021/0349395 A1 | 11/2021 | Warnaar et al. |

OTHER PUBLICATIONS

Office Action issued Dec. 15, 2025 in Taiwanes Application No. 111135654.

* cited by examiner

METHOD FOR OPTICAL PROXIMITY CORRECTION OF PHOTOMASK LAYOUT UTILIZING PARAMETERS OBTAINED THROUGH ACTUAL PHOTOMASK MANUFACTURE

CROSS-REFERENCE TO THE RELATED APPLICATION

This application claims priority from Korean Patent Application No. 10-2021-0185937, filed on Dec. 23, 2021, in the Korean Intellectual Property Office, the disclosure of which is incorporated herein by reference in its entirety.

BACKGROUND

1. Field

The example embodiments of the disclosure relate to a method for optical proximity correction (OPC) of a photomask layout.

2. Description of the Related Art

In a semiconductor process, a photolithography process, using a mask, may be performed in order to form a pattern on a semiconductor substrate such as a wafer and/or the like. The mask may refer to a pattern transfer artifact in which a pattern structure made of an opaque material is formed on a transparent base material, hi a mask manufacturing process, a desired circuit may first be designed, a layout of the circuit may then be designed, and final design data obtained through optical proximity correction (OPC) may then be transferred as mask tape-out (MTO) design data. Subsequently, a mask may be manufactured by performing mask data preparation (MDP) based on the MTh design data, performing a front-end-of-line (FEOL) process such as an exposure process, etc. and a back-end-of-line (BEOL) process such as defect inspection, etc.

SUMMARY

The example embodiments of the disclosure provide an optical proximity correction (OPC) method for checking mask rule check (MRC) violation based on mask data obtained through OPC, taking into consideration an actual layout of a photomask.

A mask layout optical proximity correction (OPC) method according to an exemplary embodiment of the disclosure includes determining a target pattern to be formed on a substrate, simulating a photomask layout based on the target pattern, applying a bias to the simulated photomask layout, thereby correcting the photomask layout into a first modeling layout, and selecting one of control parameters obtained through modeling using a layout of a split mask, thereby deforming the first modeling layout into a second modeling layout, and checking whether or not there is mask rule check (MRC) violation, based on the second modeling layout.

A mask layout optical proximity correction (OPC) method according to an exemplary embodiment of the disclosure includes determining a target pattern to be formed on a substrate, simulating a photomask layout based on the target pattern, applying a bias to the simulated photomask layout, thereby correcting the photomask layout into a first modeling layout, calculating an edge placement error (EPE) from the photomask layout on a simulated contour pattern basis, after the correction into the first modeling layout, determining whether or not the EPE is not more than a predetermined tolerance, selecting one of control parameters obtained through modeling using a layout of a split mask after the determining whether or not the EPE is not more than the predetermined tolerance, thereby deforming the first modeling layout into a second modeling layout, and checking whether or not there is mask rule check (MRC) violation, based on the second modeling layout.

A mask layout optical proximity correction (OPC) method according to an exemplary embodiment of the disclosure includes actually manufacturing a split mask, measuring a mask pattern in the split mask, extracting a layout contour of the split mask, modeling the split mask based on the layout contour, executing calibration using both a correctly-manufactured portion and an incorrectly-manufactured portion of the modeled mask and deriving a relation between a value obtained through the calibration and a value obtained through the modeling based on the contour, thereby obtaining control parameters from the derived relation, determining a target pattern to be formed on a substrate, simulating a photomask layout based on the target pattern, applying a bias to the simulated photomask layout, thereby correcting the photomask layout into a first modeling layout, and selecting one of the control parameters, thereby deforming the first modeling layout into a second modeling layout, and checking whether or not there is mask rule check (MRC) violation, based on the second modeling layout.

DETAILED DESCRIPTION OF EXEMPLARY EMBODIMENTS

Figure 1:
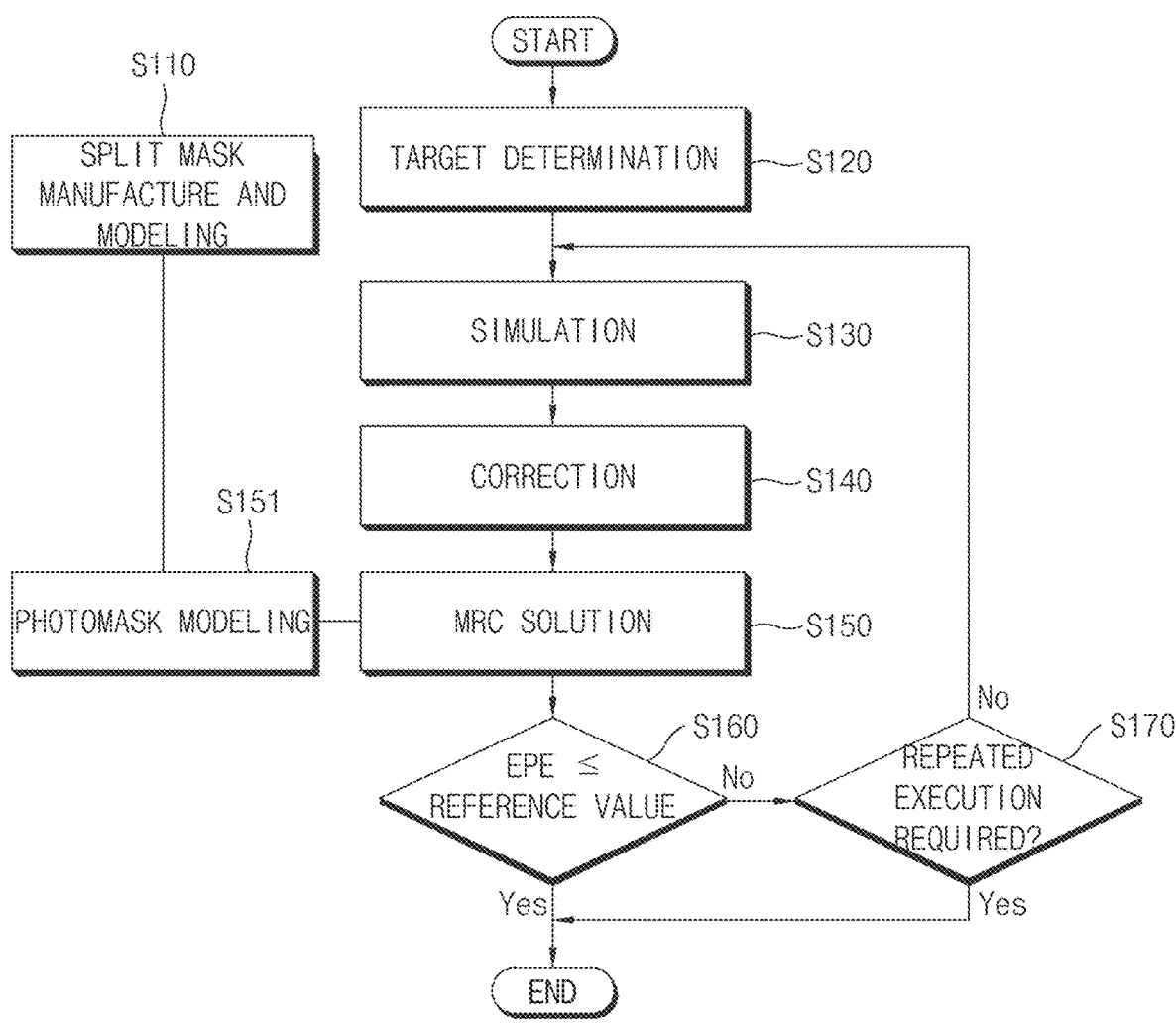
FIG. 1 is an algorithm flowchart schematically showing a procedure of an optical proximity correction (OPC) method according to some example embodiments of the disclosure.

FIG. 1 is an algorithm flowchart schematically showing a procedure of an optical proximity correction (OPC) method according to some example embodiments of the disclosure. FIGS. 2 to 5 are views explaining operations in FIG. 1.

As the fineness of patterns increases, an optical proximity effect (OPE) may be generated in an exposure process due, e.g., to influences between neighboring patterns. In order to solve such a problem, the mask layout OPC method may correct a layout of a mask pattern, thereby suppressing generation of an OPE and/or errors in the pattern based therefrom.

Referring to FIG. 1, the OPC method may include target determination S120, simulation S130, correction S140, mask rule check (MRC) solution S150, edge placement error (EPE) calculation S160, and re-execution determination S170. In some embodiments, split mask manufacture and modeling S110 may be executed prior to the target determination S120.

Figure 2:
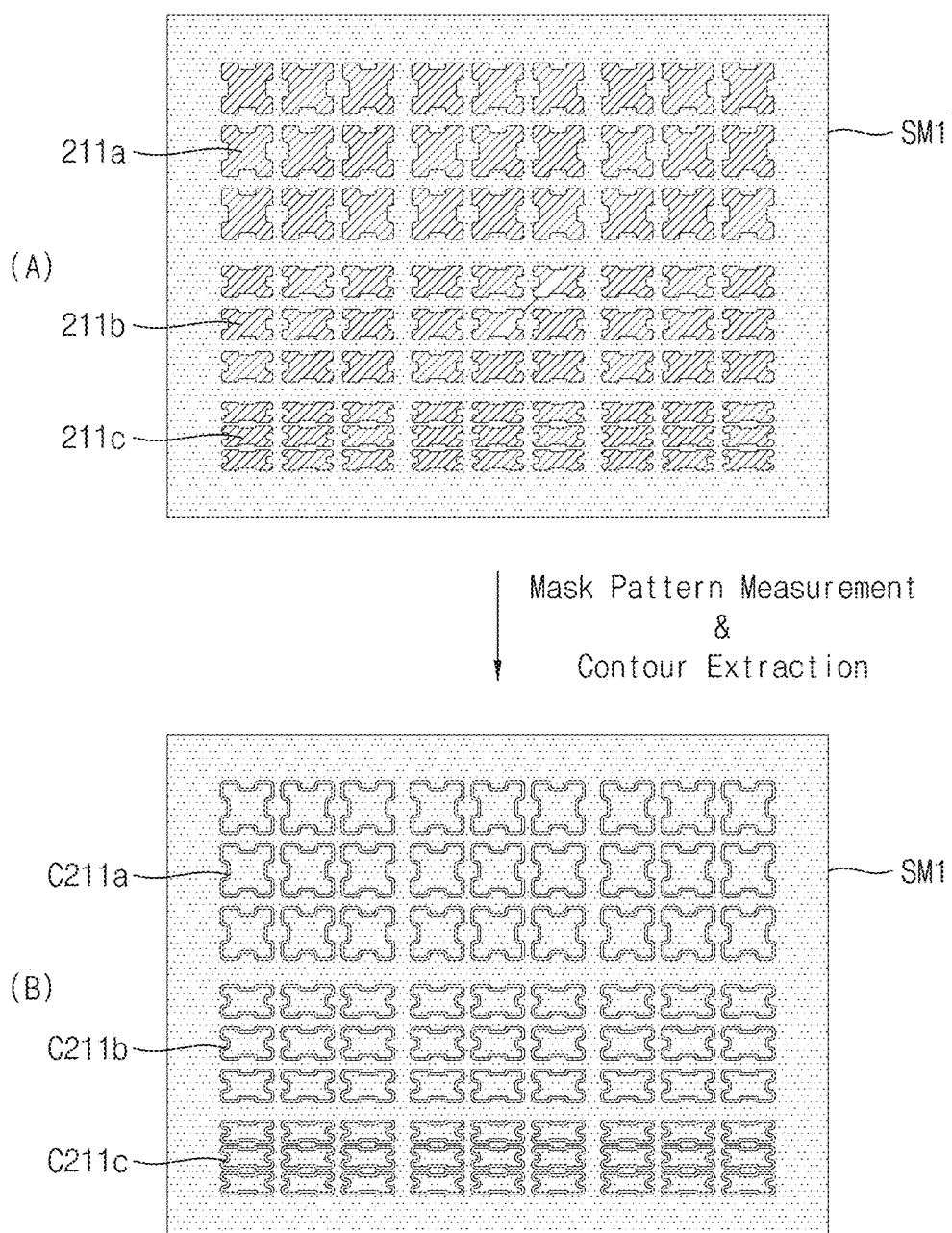
FIGS. 2 to 5 are views explaining operations in FIG. 1.

Referring to FIGS. 1 and 2, the split mask manufacture and modeling S110 corresponds to an operation of manufacturing a split mask including patterns, and then modeling the split mask.

For example, a split mask SM1 including a plurality of patterns (e.g., 211a, 211b, and 211c) may be manufactured (FIG. 2(A)). The split mask SM1 may be used to check a process limit of a mask. Therefore, in some example embodiments, no mask proximity correction (MPC) is applied to manufacture of the split mask SM1. In some example embodiments, the manufacture of the split mask SM1 may include physical (e.g., actual) manufacture of the slit mask SM1.

Thereafter, the plurality of mask patterns (e.g., 211a, 211b, and 211c) may be measured from the manufactured split mask SM1. For example, a physical size (such as a horizontal length/vertical length, a width, an inter-pattern pitch, etc.) may be measured using the actual patterns 211a, 211b, and 211c.

Subsequently, contours C211a, C211b, and C211c of the actual patterns 211a, 221b, and 221c, of the split mask SM1 may be extracted (FIG. 2(B)). The extracted contours C211a, C211b, and C211c may be, for example, simulation results. The layouts of the split mask SM1 may be modeled based on the contours C211a, C211b, and C211c.

Thereafter, calibration may be executed using both a correctly-manufactured portion and an incorrectly-manufactured portion of the mask, based on results of the modeling. A control parameter $f_n$ (n being a natural number) for pattern simulation model values (for example, values obtained through modeling based on the contours C211a, C211b and C211c) may be created based on the calibration. In some example embodiments, the control parameter $f_n$, may a plurality of parameters.

For example, each control parameter $f_n$, may be an expression of relation between a shape of the actual patterns 211a, 211b, and 211c and a shape of the modeling patterns (for example, the contours C211a, C211b, and C211c) of the split mask SM1. For example, where an expression represents a shape of the modeling pattern (the contours C211a, C211b, and C211c) is α, an expression α' representing an actual pattern may be estimated through selective application of an appropriate one of the control parameters $f_n$, (for example, $f_i$ (here, 1≤i≤n and/or 1≤i≤n).

In some example embodiments, the expression of relation between the shape of the actual patterns 211a, 211b, and 211c and the shape of the modeling patterns (for example, the contours C211a, C211b, and C211c) of the split mask SM1 may be determined from among the control parameters $f_n$ based on a probability function such as a density kernel, a Gaussian kernel, and/or the like.

For example, the pattern split mask manufacture and modeling S110 may be used to obtain (create) the control parameters $f_n$. In addition, the pattern split mask manufacture and modeling S110 may be previously executed in order to utilize control parameters $f_n$ previously created in the MRC solution S150.

Figure 3:
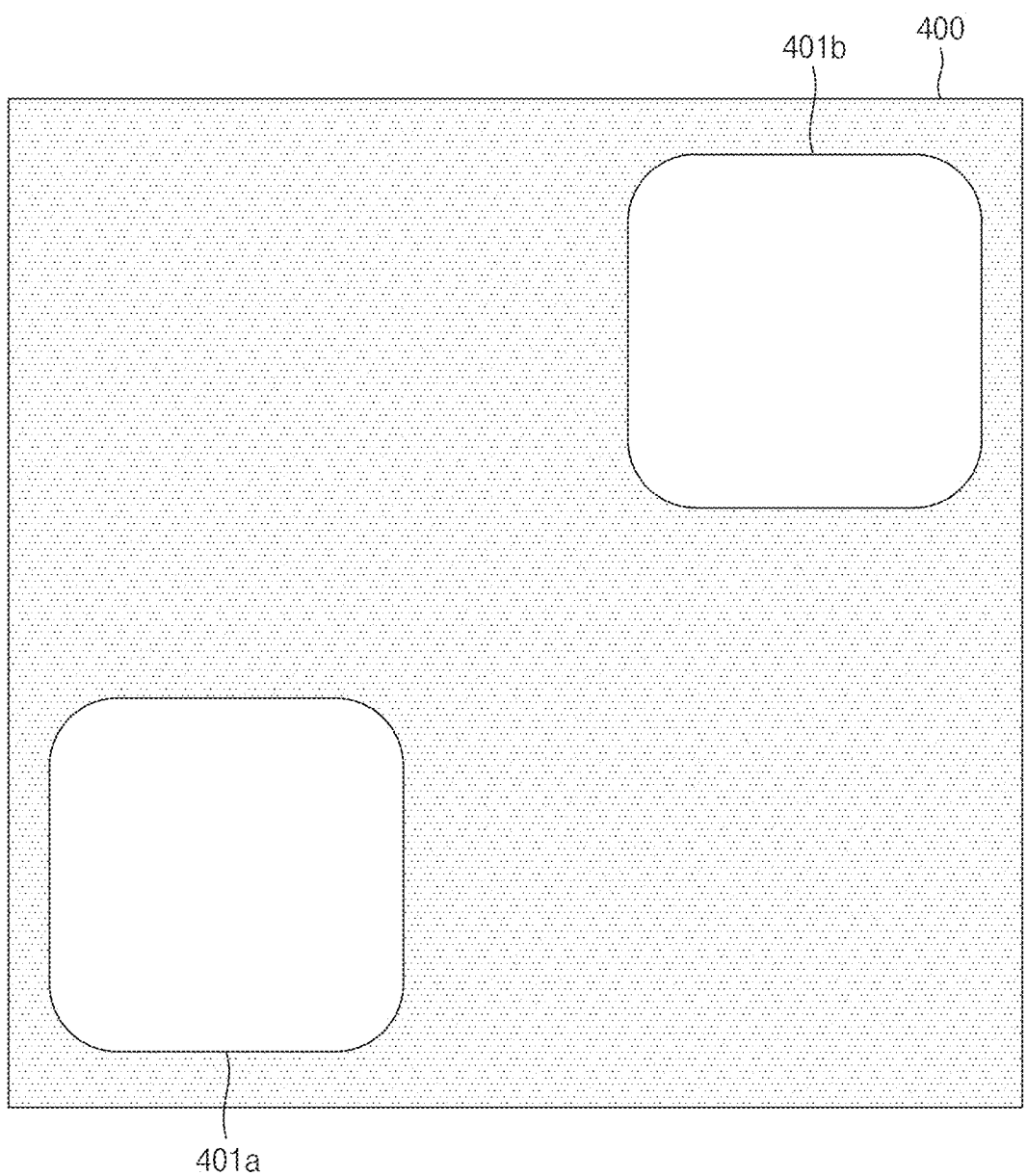

Referring to FIGS. 1 and 3, the target determination S120 may be performed as a procedure (or operation) of the OPC method. The target determination S120 is an operation of determining target patterns 401a and 401b. The target patterns 401a and 401b may refer to patterns to be formed on a substrate 400 (such as a wafer) through an exposure process using a mask.

Next, referring to FIGS. 1, 3, 4A, and 4B, the simulation S130 may be performed. The simulation S130 may correspond to an operation of simulating layouts 320a and 320b of a photomask (hereinafter, referred to as "photomask layouts") based on the target patterns 401a and 401b.

Here, the photomask layouts 320a and 320b may be a design included in a pattern on a mask and, as such, may refer to a pattern design on a mask (e.g., for the formation of the target patterns 401a and 401b). In addition, the photomask layouts 320a and 320b may mean layouts for patterns formed on a mask. In other words, the photomask layouts 320a and 320b may mean layouts of a mask including patterns for formation of the target patterns 401a and 401b.

The patterns on the mask may be transferred to the substrate 400 through an exposure process (such as a lithographic process, an extreme ultraviolet (EUV) process, an electron beam process, and/or the like) and, as such, the target patterns 401a and 401b may be formed on the substrate 400. In general, however, the shape of the targe patterns 401a and 401b and the shape of the mask patterns of the photomask layouts 320a and 320b may be different from each other due, e.g., to characteristics of the exposure process.

Figure 4A:
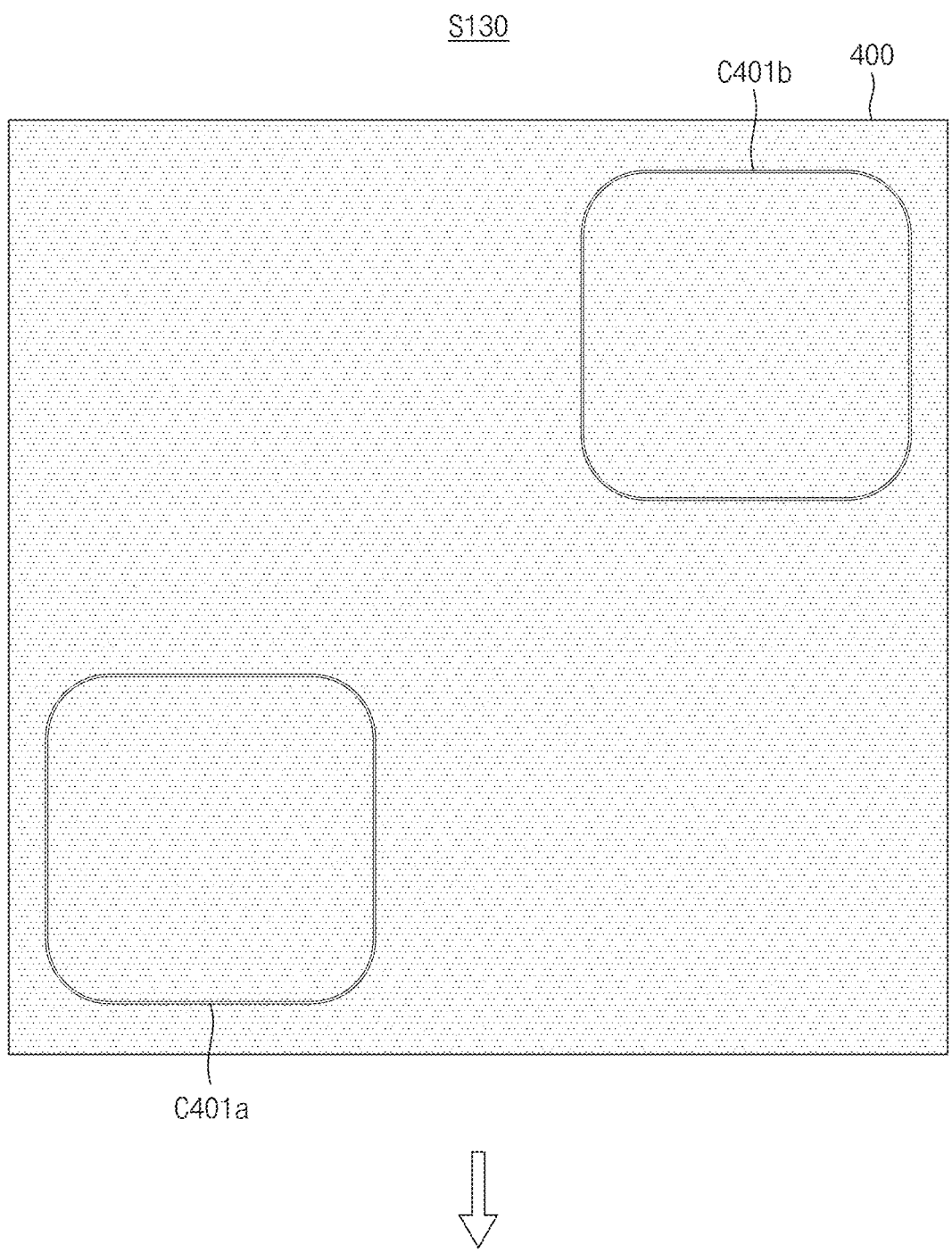
Figure 4B:
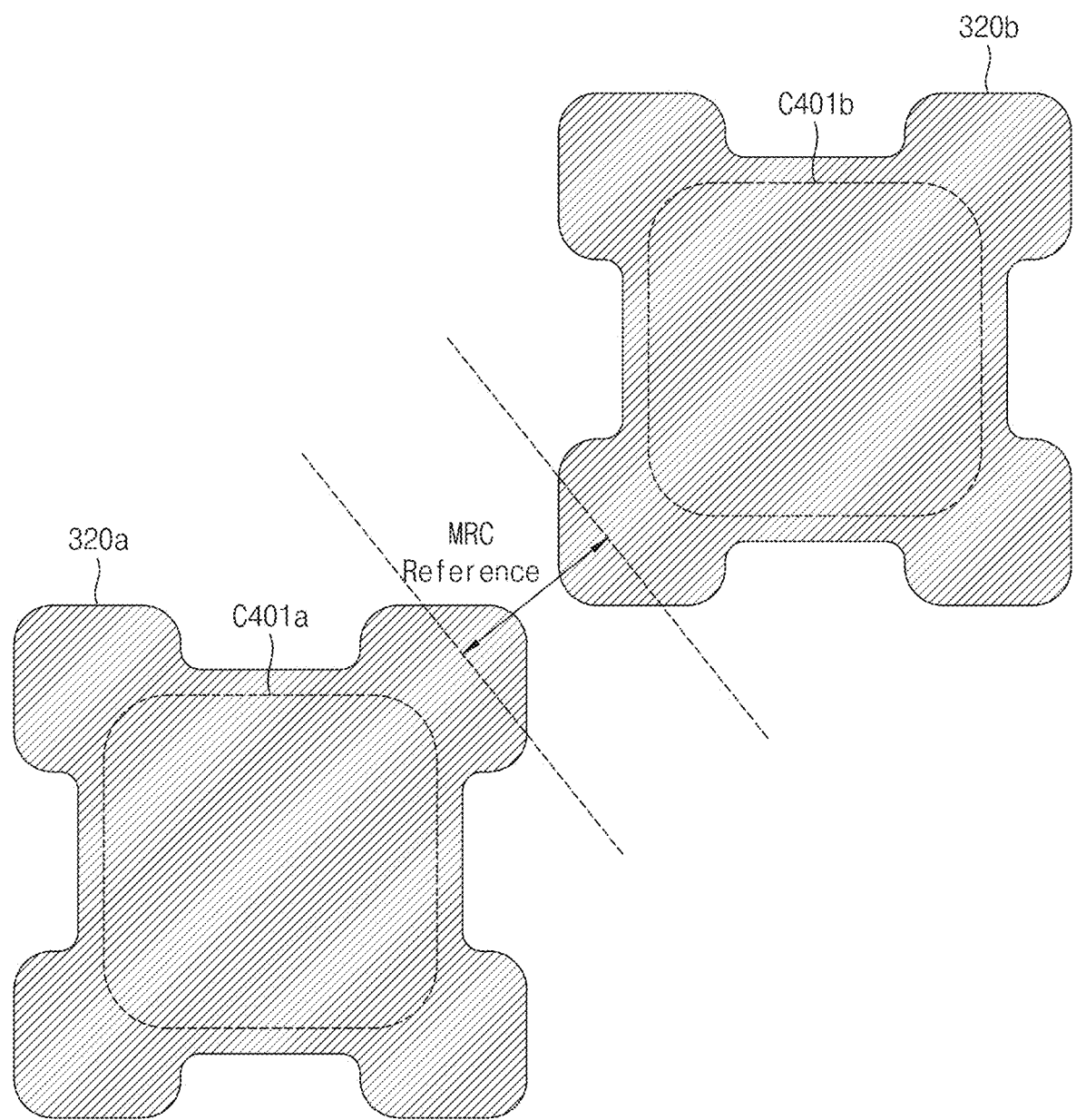
Figure 5:
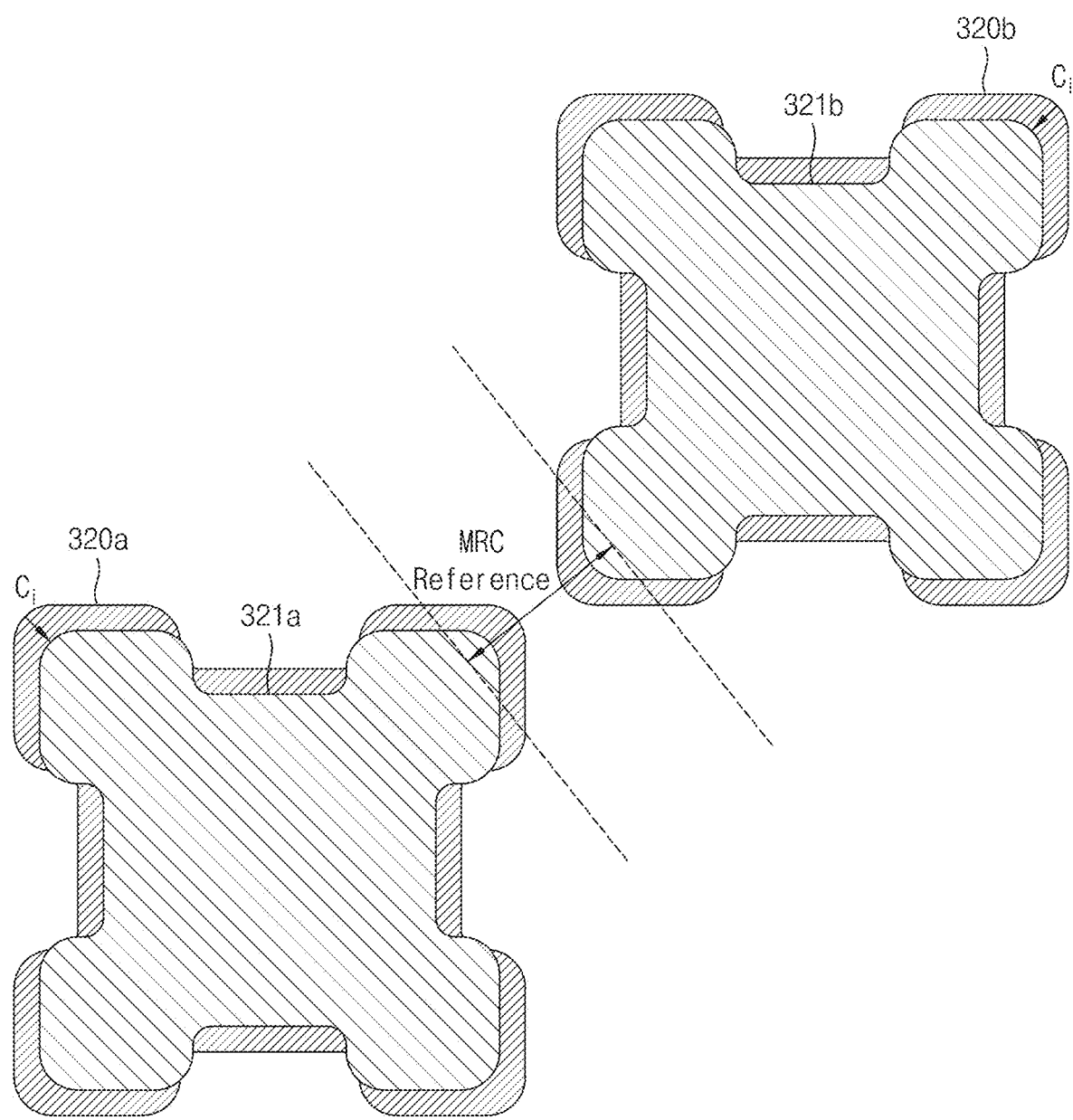

In some example embodiments, contours C401a and C401b of the target patterns 401a and 401b may be extracted from an OPC model (FIG. 4A). OPC model may, for example, be based on statistical clustering, Bayesian classification, decision trees, dimensionality reduction such as principal component analysis, expert systems, combinations thereof including ensembles such as random forests, and/or the like. In some example embodiments, the OPC model may be based on real, known, and/or established examples. Mask data may be input to the OPC model and, as such, the photomask layouts 320a and 320b may be estimated through a simulation using the contours C401a and 401b (FIG. 4B).

The OPC model is a simulation model for estimation of the photomask layouts 320a and 320b and, as such, various pieces of basic data may be input to the OPC model as input data. Here, the basic data may include mask data for the target patterns 401a and 401b. In addition, the basic data may include data such as a thickness, a refractive index, a dielectric constant, etc. of a photoresist (PR), and may include data of a source map as to the type of an illumination system. Of course, the basic data is not limited to the illustrated pieces of data. For example, in some embodiments, the mask data may include data as to shapes of patterns, positions of patterns, kinds of measurement of patterns (measurement of a space, a line, and/or the like), basic measurement values, and/or the like.

The photomask layouts 320a and 320b are results of a simulation executed using the OPC model, and may correspond to shapes of the target patterns 401a and 401b to be formed on a wafer through an exposure process using a mask. Here, the pattern on the wafer may correspond to, for example, an after develop inspection (ADI) pattern. Accordingly, making patterns formed through the exposure process using the photomask layouts 320a and 320b as similar to shapes of the target patterns 401a and 401b as possible may correspond to one purpose of the OPC method.

Modeling of the target patterns 401 and 401b through the contours C401a and C401b may be effective in modeling of the photomask layouts 320a and 320b executed taking into consideration a corner rounding phenomenon in a subsequent exposure process.

Thereafter, the correction S140 may be executed. The correction S140 may corresponds to an operation of correcting the photomask layouts 320a and 320b.

Referring to FIG. 1 and FIGS. 3 to 5, in this operation, a bias C, may be applied to the photomask layouts 320a and 320b, which are results of the modeling, thereby correcting the mask layouts 320a and 320b into first modeling layouts 321a and 321b. The bias C, may correspond to a correction value to be applied to the photomask layouts 320a and 320b modeled from the contours C401a and C401b of the target patterns 401a and 401b, which have an intended (e.g., predetermined and/or otherwise determined) size, for formation of the target patterns 401a and 401b. For example, when a photolithography process is executed using a mask manufactured based on the first modeling layouts 321a and 321b, a pattern having an intended size may be formed on the substrate 400. When a photolithography process is executed using a mask manufactured without application of the bias C, to the photomask layouts 320a and 320b, a pattern having a size different from the intended size may be formed.

Subsequently, again referring to FIG. 1, the MRC solution S150 may be executed. The MRC solution S150 corresponds to an operation of checking whether (or not) patterns included in final photomask layouts (for example, second modeling layouts 322a and 322b (FIG. 8) deformed from the first modeling layouts 321a and 321b) violate a mask rule check (MRC), and whether (or not) removing regions of the patterns when the patterns violate the MRC solves the violation.

In some example embodiments, the MRC solution S150 may include photomask modeling (S151). For example, the first modeling layouts 321a and 321b may be corrected into final photomask layouts using the control parameter $f_n$ previously known through the split mask manufacture and modeling S110.

In some example embodiments, the MRC solution S150 may include checking as to whether the MRC violation may be executed based on the final photomask layouts in order to determine whether (or not) the patterns included in the mask layouts violate the MRC in the MRC solution S150.

An example of the MRC solution S150 will be described in further detail below.

Subsequently, edge placement error (EPE) calculation S160 may be executed. The EPE calculation S160 corresponds to an operation of calculating an EPE from the final photomask layouts (for example, the second modeling layouts 322a and 322b (FIG. 8)) on a simulated contour pattern basis, after execution of the checking as to MRC violation, and then determining whether or not the EPE is not more than (or less than) a predetermined (or otherwise determined) tolerance (reference value).

The EPC may refer to a distance or a difference between an edge of a curved-line target pattern and an edge of a contour (simulated based on a final photomask layout). Here, the curved-line target pattern may mean a pattern approximately similar to the target patterns 401a and 401b, but may mean a pattern to which a minimum round shape is applied at a corner portion, taking into consideration a corner rounding phenomenon in an exposure process.

Generally, when an EPE is great, the difference between the curved-line target patterns 401a and 401b and the contours may be great, and this may mean that the resultant final photomask layout is unsuitable for formation of the target patterns 401a and 401b. In order to realize a photomask layout optimized for formation of the target patterns 401a and 401b, a procedure of lowering the EPE to a predetermined reference value or less by varying the photomask layout may be needed.

The EPE may be calculated for each pattern formed at the photomask layout. For calculation of the EPE on a pattern basis, a control point may be selected on a curved-line target pattern. For example, based on the pattern, one control point may be selected and/or a plurality of control points may be selected. In some example embodiments, a plurality of patterns may be used together with one control point.

Subsequently, when the EPE exceeds (or is not less than or equal to) the reference value (No), re-execution determination S170 may be executed. For example, when the EPE exceeds the reference value (No), re-execution of the simulation S130 may be determined, whereas, when the EPE is not more than the reference value (Yes), no re-execution of the simulation S130 may be determined.

Meanwhile, in some example embodiments, whether (or not) the simulation S130 should be re-executed may be determined (or performed) through comparison of the number of repetition times of operations from the simulation S130 to the MRC solution S150 with a predetermined (or otherwise determined) reference number of times. For example, when the number of repetition times of operations from the simulation S130 to the MRC solution S150 is less than the reference number of times, re-execution of the simulation S130 may be performed, whereas, when the number of repetition times of operations from the simulation S130 to the MRC solution S150 corresponds to the reference number of times, no re-execution of the simulation S130 may be performed. Here, the reference number of times may be determined based on an average number of times or a maximum number of times when the EPE reaches the reference value in repeated execution of the simulation S130 and the MRC solution S150 for previous target patterns 401a and 401b.

For example, when the simulation S130 is re-executed (Yes), displacements (DISs) of the patterns may be calculated and, as such, the patterns may be displaced. This may correspond to a variation of the photomask layout.

Thereafter, the procedure may proceed to the simulation S130 and, as such, a contour may be again extracted by inputting mask data to the OPC model. Here, data of the patterns previously varied in accordance with displacement may be input to the OPC model as mask data.

When the simulation S130 is not re-executed in the re-execution determination S170 (No), or the EPE is not more than the reference value in the EPE calculation S160 (Yes), the final mask data may be determined. Here, the final mask data may be mask data including data of patterns at final positions.

Figure 6:
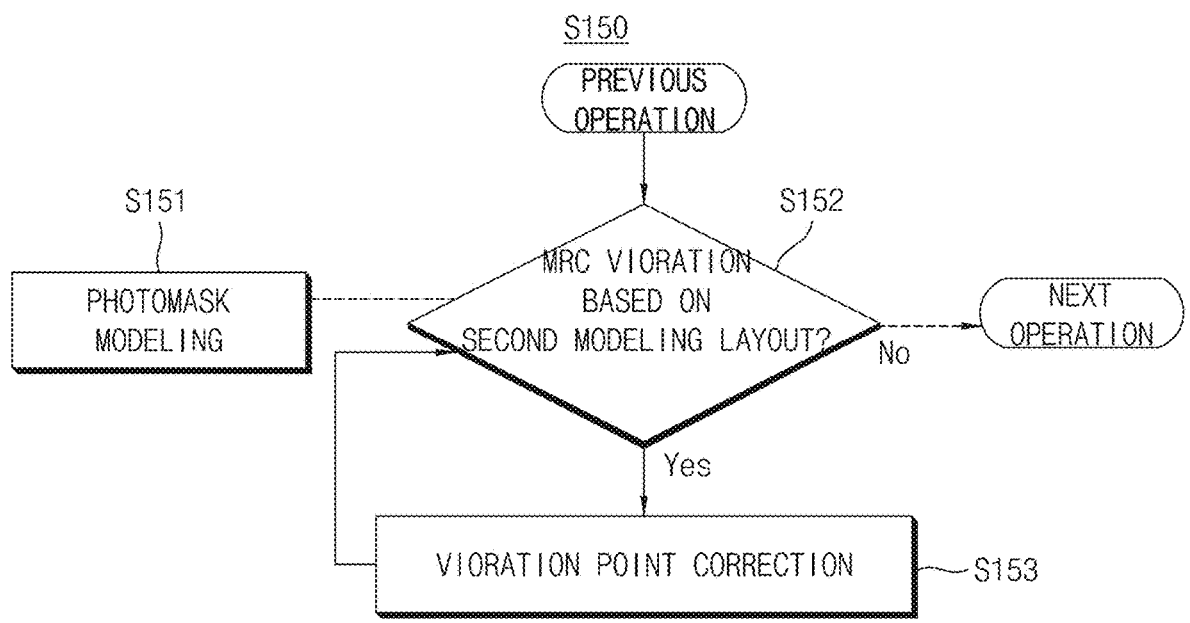
FIG. 6 is a schematic flowchart explaining MRC solution of FIG. 1.
Figure 7:
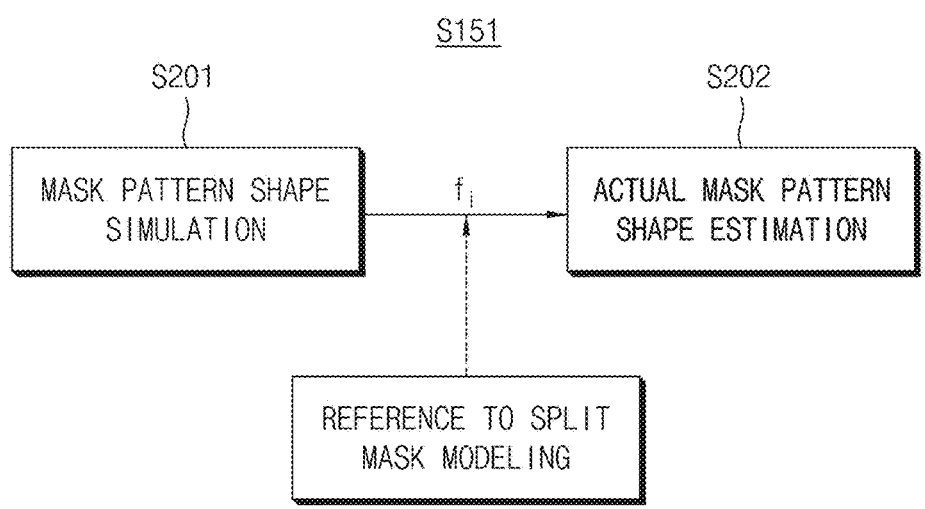
FIG. 7 is a schematic flowchart explaining photomask modeling of FIG. 6.
Figure 8:
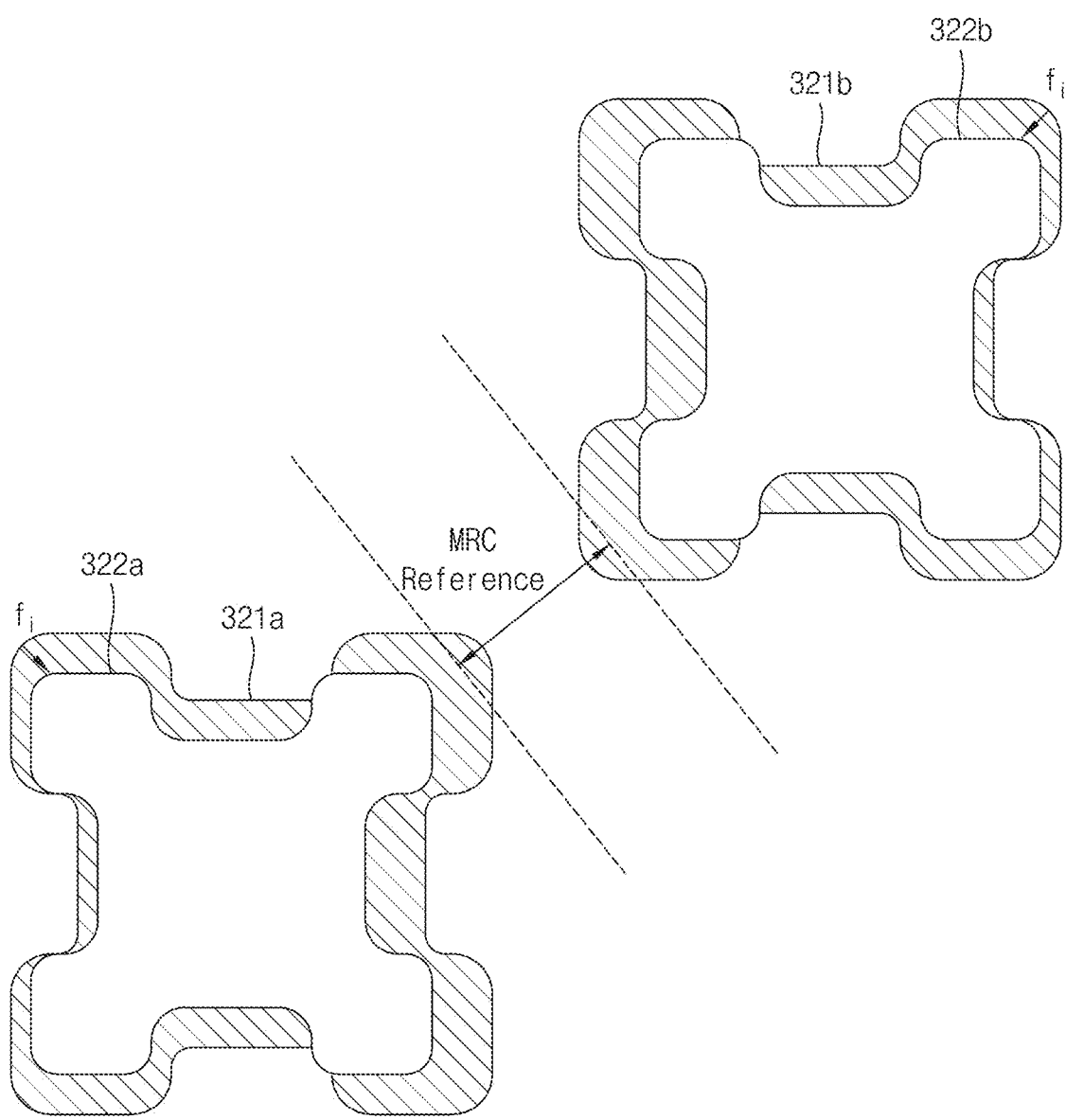
FIG. 8 is a view explaining correction of a first modeling layout into a second modeling layout in the photomask modeling.

FIG. 6 is a schematic flowchart explaining the MRC solution of FIG. 1. FIG. 7 is a schematic flowchart explaining photomask modeling of FIG. 6. FIG. 8 is a view explaining correction of a first modeling layout into a second modeling layout in the photomask modeling.

Referring to FIGS. 6 to 8, the MRC solution S150 may include photomask modeling S151, MRC violation checking S152, and violation point correction S153.

The photomask modeling S151 corresponds to correction of the first modeling layouts 321a and 321b into the second modeling layouts 322a and 322b through selective application of an appropriate one of the control parameters $f_n$. In the photomask modeling S151, a shape of a mask pattern (for example, the patterns of the first modeling layouts 321a and 321b) may be simulated (S201), and a shape of an actual mask pattern (for example, patterns of the second modeling layouts 322a and 322b) may be estimated through application of a control parameter $f_i$ obtained with reference to modeling of the split mask SM1 to the resultant simulation value (S202).

For example, the control parameters $f_n$, may be (and or included in) a data library for various patterns. For example, a control parameter for a pattern identical or similar to each pattern included in the first modeling layout 321a and 321b may be retrieved, and respective patterns included in the first modeling layouts 321a and 321b as patterns included in the second modeling layouts 322a and 322b through application of the retrieved control parameter. Here, the patterns included in the second modeling layouts 322a and 322b may be patterns estimated as shapes of actual mask patterns.

The MRC violation checking S152 correspond to an operation of checking MRC violation of the patterns included in the second modeling layouts 322a and 322b. For example, the MRC violation checking S152 may utilize the second modeling layouts 322a and 322b created in the photomask modeling S151.

In some embodiments, when MRC violation checking is executed for the patterns included in the first modeling layouts 321a and 321b, there may be MRC violation, whereas, when MRC violation checking is executed for the patterns included in the second modeling layouts 322a and 322b, there may be no MRC violation (FIG. 8).

When there is MRC violation of the patterns included in the second modeling layouts 322a and 322b in the MRC violation checking S152 (Yes), the violation point correction S153 may be executed. The violation point correction S153 corresponds to an operation of removing a region of each of patterns violating the MRC from among the patterns of the second modeling layouts 322a and 322b, thereby correcting the patterns of the second modeling layouts 322a and 322b such that the patterns do not violate the MRC. After execution of the violation point correction S153, the MRC violation checking S152 may again be executed.

When there is no MRC violation of the patterns included in the second modeling layouts 322a and 322b in the MRC violation checking S152 (No), a next operation (for example, EPE calculation S160 of FIG. 1) may be executed.

Hereinafter, an OPC method for a mask layout according to some example embodiments of the disclosure will be described. In the following description, no description will be given of constituent elements similar to those of FIGS. 1 to 8, and identical or similar reference numerals will be used for the constituent elements.

Figure 9:
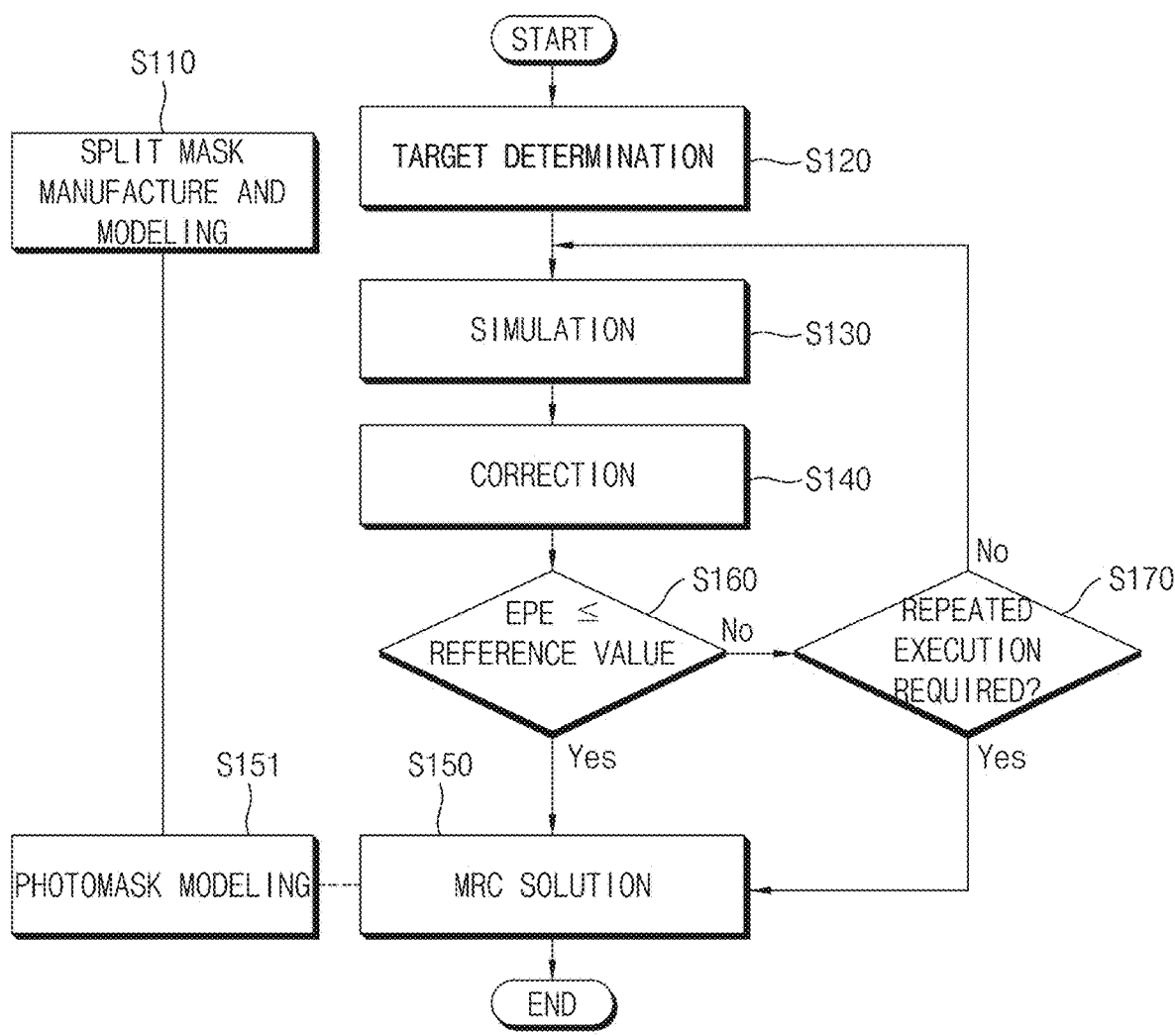
FIG. 9 is an algorithm flowchart schematically showing a procedure of an OPC method according to some example embodiments of the disclosure.

FIG. 9 is an algorithm flowchart schematically showing a procedure of an OPC method according to some example embodiments of the disclosure.

Referring to FIG. 9, the OPC method according to this embodiment differs from that of the embodiment of FIG. 1 in that MRC solution S150 is executed after execution of edge placement error (EPE) calculation S160 and re-execution determination S170.

In an embodiment, the OPC method may include target determination S120, simulation S130, correction S140, EPE calculation S160, re-execution determination S170, and MRC solution S150. In some embodiments, pattern split mask manufacture and modeling S110 may be executed prior to the target determination S120.

In some example embodiments, the EPE calculation S160 may be executed between the correction S140 and the MRC solution S150.

For example, the EPE calculation S160 corresponds to an operation of calculating an edge placement error (EPE) from photomask layouts (for example, first modeling layouts 321a and 321b) on a simulated contour pattern basis, and then determining whether (or not) the EPE is not more than (or less than) a tolerance (reference value).

When the EPE exceeds (or is not less than) the reference value (No), the re-execution determination S170 may be executed. For example, when the EPE exceeds the reference value (No), re-execution of the simulation S130 may be determined, whereas, when the EPE is not more than the reference value (Yes), no re-execution of the simulation S130 may be determined.

When the EPE is not more than the reference value in the EPE calculation S160 (Yes), the MRC solution S150 may be executed. After the MRC solution S150, final mask data may be determined.

In accordance with the example embodiments of the disclosure, MRC violation may be checked, taking into consideration an actual layout. Accordingly, it may be possible to prevent an operation of correcting MRC violation from being erroneously executed when a photomask layout does not actually violate an MRC.

Effects according to the example embodiments of the disclosure are not limited to the above-illustrated contents, and more various effects and advantages may be included in the specification.

While some example embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation.

What is claimed is:

1. A mask layout optical proximity correction (OPC) method comprising:
  determining a target pattern to be formed on a substrate;
  simulating a photomask layout based on the target pattern;
  applying a bias to the simulated photomask layout such that the photomask layout is corrected into a first modeling layout;
  selecting at least one control parameter, the at least one control parameter obtained through modeling using a layout of a split mask, the split mask including a plurality of actual patterns each representing a change to a physical component of a test pattern;
  checking whether there is a mask rule check (MRC) violation based on the first modeling layout;
  deforming the first modeling layout into a second modeling layout based on the selected at least one control parameter; and
  checking whether there is the MRC violation, based on the second modeling layout,
  wherein when the MRC violation checking is executed based on the first modeling layout and there is the MRC violation, the deforming the first modeling layout into the second modeling layout corrects the MRC violation such that when the MRC violation checking is executed based on the second modeling layout, there is no MRC violation.

2. The mask layout OPC method according to claim 1, further comprising:
  manufacturing the split mask.

3. The mask layout OPC method according to claim 2, further comprising:
  measuring at least one mask pattern in the split mask; and
  extracting at least one layout contour of the split mask.

4. The mask layout OPC method according to claim 3, further comprising:
  modeling the layout of the split mask based on the extracted at least one layout contour; and
  calibrating the modeling through which the at least one control parameter is obtained using both a correctly-manufactured portion and an incorrectly-manufactured portion of the modeled layout of the split mask.

5. The mask layout OPC method according to claim 4, wherein the at least one control parameter includes at least one of a value obtained through the calibration or a value obtained through the modeling based on the at least one layout contour.

6. The mask layout OPC method according to claim 5, wherein the manufacturing of the split mask is executed prior to the determining the target pattern.

7. The mask layout OPC method according to claim 5, wherein the at least one control parameter is based on at least one of a density kernel or a Gaussian kernel.

8. The mask layout OPC method according to claim 2, further comprising:
comparing a number of repetitions of the simulating, the correcting, and the checking for the MRC violation with a reference number to determine whether the simulating, the correcting and the MRC violation checking should be repeated.

9. The mask layout OPC method according to claim 8, wherein, when the simulating, the correcting, and the MRC violation checking are repeated, the manufacturing the split mask is not repeated.

10. The mask layout OPC method according to claim 1, wherein the deforming the first modeling layout includes removing a region of the target pattern when there is the MRC violation in the first modeling layout.

11. The mask layout OPC method according to claim 1, further comprising:
calculating an edge placement error (EPE) from the photomask layout based on a simulated contour pattern, after the MRC violation checking; and
determining whether the EPE is not more than a tolerance threshold.

12. A mask layout optical proximity correction (OPC) method comprising:
determining a target pattern to be formed on a substrate;
simulating a photomask layout based on the target pattern;
applying a bias to the simulated photomask layout such that the photomask layout is corrected into a first modeling layout;
calculating an edge placement error (EPE) from the photomask layout based on a simulated contour pattern, after the correction into the first modeling layout;
determining whether the EPE is not more than a tolerance threshold;
selecting at least one control parameter after the determining whether the EPE is not more than the tolerance threshold, the at least one control parameter obtained through modeling using a layout of a split mask, and the split mask including a plurality of actual patterns each representing a change to a physical component of a test pattern;
checking whether there is a mask rule check (MRC) violation based on the first modeling layout;
deforming the first modeling layout into a second modeling layout based on the selected at least one control parameter; and
checking whether there is the MRC violation, based on the second modeling layout,
wherein when the MRC violation checking is executed based on the first modeling layout and there is the MRC violation, the deforming the first modeling layout into the second modeling layout corrects the MRC violation such that when the MRC violation checking is executed based on the second modeling layout, there is no MRC violation.

13. The mask layout OPC method according to claim 12, wherein the at least one control parameter is created prior to the determining the target pattern.

14. The mask layout OPC method according to claim 13, wherein the creation of the at least one control parameter includes
manufacturing the split mask,
measuring at least one mask pattern in the split mask,
extracting at least one layout contour of the split mask,
modeling the layout of the split mask based on the extracted at least one layout contour,
calibrating the modeling through which the at least one control parameter is obtained using both a correctly-manufactured portion and an incorrectly-manufactured portion of the modeled layout of the split mask, and
deriving a relation between a value obtained through the calibration and a value obtained through the modeling based on the contour.

15. The mask layout OPC method according to claim 14, wherein the manufacturing the split mask, the measuring the at least one mask pattern in the split mask, and the extracting the at least one layout contour of the split mask are executed prior to the determining the target pattern.

16. A mask layout optical proximity correction (OPC) method comprising:
preparing a model of a split mask by
manufacturing the split mask such that the split mask includes a plurality of actual patterns each representing a change to a physical component of a test pattern,
measuring at least one mask pattern in the split mask,
extracting at least one layout contour of the split mask,
modeling a layout of the split mask based on the extracted at least one layout contour,
calibrating the model of the split mask using both a correctly-manufactured portion and an incorrectly-manufactured portion of the modeled layout of the split mask,
deriving a relation between a value obtained through the calibration and a value obtained through the modeling based on the at least one layout contour, and
obtaining control parameters from the derived relation;
determining a target pattern to be formed on a substrate;
simulating a photomask layout based on the target pattern;
applying a bias to the simulated photomask layout such that the photomask layout is corrected into a first modeling layout;
selecting at least one of the control parameters;
checking whether there is a mask rule check (MRC) violation based on the first modeling layout;
deforming the first modeling layout into a second modeling layout based on the at least one selected control parameter; and
checking whether there is the MRC violation, based on the second modeling layout,
wherein when the MRC violation checking is executed based on the first modeling layout and there is the MRC violation, the deforming the first modeling layout into the second modeling layout corrects the MRC violation such that when the MRC violation checking is executed based on the second modeling layout, there is no MRC violation.

17. The mask layout OPC method according to claim 16, wherein the control parameters are created prior to the determining the target pattern.

18. The mask layout OPC method according to claim 16, further comprising:
- comparing a number of repetitions of the simulating, the correcting, and the checking for the MRC violation with a reference number to determine whether the simulating, the correcting, and the MRC violation checking should be repeated,
- wherein, when the simulating, the correcting and the MRC violation checking are repeated, the obtaining the control parameters is not repeated.

* * * * *